United States Patent
Ives (10) Patent No.: US 7,395,444 B2
(45) Date of Patent: Jul. 1, 2008

(54) POWER STATUS NOTIFICATION

(75) Inventor: Edward M. Ives, West Kingston, RI (US)

(73) Assignee: American Power Conversion Corporation, West Kingston, RI (US)

( * ) Notice: Subject to any disclaimer, the term of this patent is extended or adjusted under 35 U.S.C. 154(b) by 266 days.

(21) Appl. No.: 10/668,621

(22) Filed: Sep. 23, 2003

(65) Prior Publication Data

US 2006/0168191 A1    Jul. 27, 2006

(51) Int. Cl.
*G06F 13/14*    (2006.01)

(52) U.S. Cl. ............ 713/340; 713/320; 713/321; 713/322; 713/323; 713/324; 709/201; 709/202; 709/203; 709/217; 709/218; 709/219; 709/223; 709/207; 709/250

(58) Field of Classification Search ......... 709/201–203, 709/217–219, 223–224, 250, 207; 713/310, 713/330, 340, 320–324
See application file for complete search history.

(56) References Cited

U.S. PATENT DOCUMENTS

| | | | |
|---|---|---|---|
| 6,430,687 B1 * | 8/2002 | Aguilar et al. ................. 713/2 |
| 6,677,894 B2 * | 1/2004 | Sheynblat et al. ........ 342/357.1 |
| 6,711,613 B1 * | 3/2004 | Ewing et al. ................ 709/223 |
| 6,856,804 B1 * | 2/2005 | Ciotta ...................... 455/435.1 |
| 6,912,486 B2 * | 6/2005 | Wang ......................... 702/188 |
| 6,917,545 B1 * | 6/2005 | Lundy et al. ............. 707/104.1 |
| 6,940,956 B1 * | 9/2005 | Leach .................... 379/106.01 |
| 7,009,510 B1 * | 3/2006 | Douglass et al. ............ 340/531 |
| 7,159,022 B2 * | 1/2007 | Primm et al. ................ 709/224 |
| 2004/0215693 A1 * | 10/2004 | Thompson ................... 709/201 |
| 2005/0235174 A1 * | 10/2005 | Curt et al. ................... 713/340 |

OTHER PUBLICATIONS

Divan et al. *IEEE*, 6 pgs. (2002).
I-grid, *SoftSwitching Technologies-I-Grid*, "What is the I-Grid", 4 pgs. (2003).
I-grid, *SoftSwitching Technologies-I Sense Product Information*, "I-Sense", 2 pgs. (2003).
I-grid System, *SoftSwitching Technologies*, "The I-Grid System: Utility Applications", 4 pgs. (2003).
I-grid System, *SoftSwitching Technologies*, "The I-Grid System: Industry Applications", 4 pgs. (2003).
I-grid System, *SoftSwitching Technologies*, "The I-Grid System: All You Need in PQ Monitoring . . . at a Fraction of the Cost", 4 pgs. (2003).

* cited by examiner

*Primary Examiner*—A. Elamin
(74) *Attorney, Agent, or Firm*—Townsend and Townsend and Crew LLP (57) ABSTRACT

A computer program product is for use with a computer that includes a communication interface for sending and receiving information over a communication network and that is connected to an uninterruptible power supply (UPS) that monitors and supplies information regarding power status associated with the UPS. The computer program product resides on a computer-readable medium and includes computer-executable instructions for causing the computer to process data received from the UPS to which the computer is coupled to produce indicia of changes in power status associated with the UPS, provide the indicia of changes in power status associated with the UPS to the communication interface destined for a remote device, and provide geographic information associated with the indicia of changes in power status that indicates a geographic location associated with the UPS.

28 Claims, 4 Drawing Sheets

POWER STATUS NOTIFICATION

FIELD OF THE INVENTION

The invention relates to power outage monitoring and reporting.

BACKGROUND OF THE INVENTION

Today's companies and persons rely on having power more than ever before. Without power, companies may be unable to manufacture goods, or to operate at all, such as if the company is in the business of supplying information over the Internet. Without power, businesses and individuals may be completely incapacitated regarding critical activities, such as making goods, providing services, and transacting personal finances (e.g., filing tax returns, and paying bills).

With such a heavy reliance on power, individuals and companies frequently need to be able to have power outages corrected in short order, and/or have backup power supplies so that their affairs and/or businesses are not significantly affected. Correcting power outages typically involves calling a local power company to report a power outage and/or troubleshooting a local power supply/conveyance system, e.g., internal to a company or residence, that has gone out. Uninterruptible power supplies (UPSs) are often used to provide backup power in case of a power outage. UPSs are commonly used on computing equipment to guard against data being lost due to a power outage before the data are saved. UPSs used with computing equipment also help to guard against a loss in service by providers of information over the Internet, such as by servers, e.g., hosting web pages.

SUMMARY OF THE INVENTION

In general, in an aspect, the invention provides a computer program product for use with a computer that includes a communication interface for sending and receiving information over a communication network and that is connected to an uninterruptible power supply (UPS) that monitors and supplies information regarding power status associated with the UPS, the computer program product residing on a computer-readable medium and including computer-executable instructions for causing the computer to process data received from the UPS to which the computer is coupled to produce indicia of changes in power status associated with the UPS, provide the indicia of changes in power status associated with the UPS to the communication interface destined for a remote device, and provide geographic information associated with the indicia of changes in power status that indicates a geographic location associated with the UPS.

Implementations of the invention may include one or more of the following features. The computer program product further includes instructions for causing the computer to process data entered by a user of the computer to produce the geographic information. The computer program product further includes instructions for causing the computer to process external power-status information received via the communication interface and to display indicia of power status and at least one geographic region associated with the indicia of power status in accordance with the processed external power-status information. The computer program product further includes instructions for causing the computer to display indicia of weather condition associated with each of the at least one geographic region. The computer program product further includes instructions for causing the computer to store data regarding changes in power status for historical display associated with at least one period of time. The computer program product further includes instructions for causing the computer to display an indication of a quantity of UPSs experiencing power failures in the geographic region.

In general, in another aspect, the invention provides an apparatus for communicating via a communication network with multiple remote devices connected to uninterruptible power supplies (UPSs) that monitor and supply information regarding power status associated with the UPSs, the apparatus including a communication interface configured to transfer data with the communication network, and a processor coupled to the communication interface and configured to: collect power-status data and associated geographic data received from the remote devices via the communication interface, the power-status data indicating power status of the UPSs associated with the remote devices providing the power-status data, the geographic data indicating geographic locations associated with the UPSs; analyze the power-status data and associated geographic data to determine power status of geographic regions indicated by the geographic data in accordance with the corresponding power-status data; and send indicia of the determined power status of at least one geographic region toward at least one of the remote devices via the communication network.

Implementations of the invention may include one or more of the following features. The processor is configured to collect weather data for each region and to provide indicia of the weather for the at least one geographic region to the at least one of the remote devices. The processor is further configured to store the determined power status and to provide historical power status for the at least one geographical region. The processor is configured to determine at least one of percentages and numbers of remote devices in a region whose power is anomalous. The processor is configured to send the determined power status data at least one of periodically and in response to a received indication of a power status change from at least one of the remote devices. The processor is further configured to monitor heartbeat signals from the remote devices and provide indicia of failures if the processor fails to detect at least one heartbeat signal in a threshold amount of time.

In general, in another aspect, the invention provides a method of indicating power status in multiple geographic regions, the method including receiving, at a plurality of devices, indicia of power status from multiple uninterruptible power supplies (UPSs) coupled to the devices, determining power-status data from the received indicia, receiving power-status data from the plurality of devices coupled to the UPSs via a communication network, analyzing the power-status data according to multiple geographic regions associated with the power-status data, and sending indicia of power status associated with the multiple geographic regions toward at least one of the plurality of devices via the communication network.

Implementations of the invention may include one or more of the following features. The method further including determining weather for the multiple geographic regions and sending indicia of the weather in the respective regions toward at least one of the plurality of devices via the communication network. The sending occurs at least one of periodically, in response to receiving an indication of a power-status change from at least one of the plurality of devices, and on demand by a user-initiated action. The method further including displaying the indicia of power status at the at least one of the plurality of devices to indicate power status of the multiple geographic regions. The displaying comprises displaying a map of the multiple geographic regions and associated indicia of power status.

Also, implementations of the invention may include one or more of the following features. The method further includes displaying the indicia of power status at the at least one of the plurality of devices to indicate power status of at least one of the multiple geographic regions in any of a variety of resolutions of geography. The method further includes displaying at least one of a number and a percentage of UPSs in the at least one geographic region whose power is anomalous. The method further includes displaying the indicia of power status at the at least one of the plurality of devices to show power status over any of a selected variety of historical time periods. The method further includes sending an indication to a selected one of the plurality of devices indicating a local power anomaly in response to determining that relatively few power anomalies are associated with a geographic region associated with the selected device.

In general, in another aspect, the invention provides, in combination, an uninterruptible power supply (UPS), and a device for use with a communication interface for sending and receiving information over a communication network, the device being configured to: determine, from information received from the UPS, indicia of power status at the UPS; provide indicia of changes in power status at the UPS to the communication interface destined for a remote server; and provide geographic information associated with the indicia of changes in power status that indicates a geographic location of the UPS.

Implementations of the invention may include one or more of the following features. The device includes a computer program product residing on a computer-readable medium and comprising computer-readable and computer-executable instructions for causing a computer to provide the indicia and to provide the geographic information. The device includes a card configured to be physically and electrically coupled to the UPS and includes the communication interface.

Various aspects of the invention may provide one or more of the following advantages. Persons can view power status information in an easily-understandable format. Power status information can be displayed as a map. Power status information can be provided for a selectable geographic resolution. Power status information can be displayed for a variety of time frames, such as current status, current day, previous week, or previous month. A system that reports a power anomaly can be notified that the power anomaly is likely due to an issue/problem that is local/specific to that system. Power status information can be provided in conjunction with weather information corresponding to geographic regions. Potential customers of uninterruptible power supplies (UPSs) can be provided with information as to power status geographically and/or historically, e.g., to demonstrate the importance of using a UPS.

These and other advantages of the invention, along with the invention itself, will be more fully understood after a review of the following figures, detailed description, and claims.

DETAILED DESCRIPTION OF PREFERRED EMBODIMENTS

Embodiments of the invention provide techniques for monitoring, reporting, viewing, and analyzing power outages. Power outages can be monitored at distributed locations, reported to a centralized system, processed (including being analyzed) into desirable formats, reported to distributed locations, that may include one or more of the monitored locations, viewed, and analyzed at the distributed locations. For example, power-management software may be associated with UPSs and may monitor performance and input power of the UPS. Devices containing the power-management software can be distributed throughout the country, and even globally. The management software can report UPS backup power usage, indicating a utility power anomaly, to a central processor. Power anomaly reporting may occur over a network such as the Internet using any of a number of techniques, for instance a Hyper-Text Transfer Protocol (HTTP) command. The central processor, e.g., in a server, can analyze and otherwise process the reported data to determine current power status, and store and organize historical power anomaly (including outage, overvoltage, and undervoltage) information, e.g., by region such as zip code. Reports can be generated and information provided to users, e.g., users of the UPSs and others, in various ways such as over the Internet. The reports may take the form of a map or other display indicating current and/or historical power outage by region. The display could also reflect current weather conditions and/or events such as thunderstorms, lightning, and/or tornadoes. The display could be part of a screen saver program on a user's computer, and/or part of a non-screen-saver program that runs constantly, or upon request of the user. The display can be used as an in-store display showing power anomalies as a way to encourage sales of UPSs. Other embodiments are within the scope of the invention.

Figure 1:
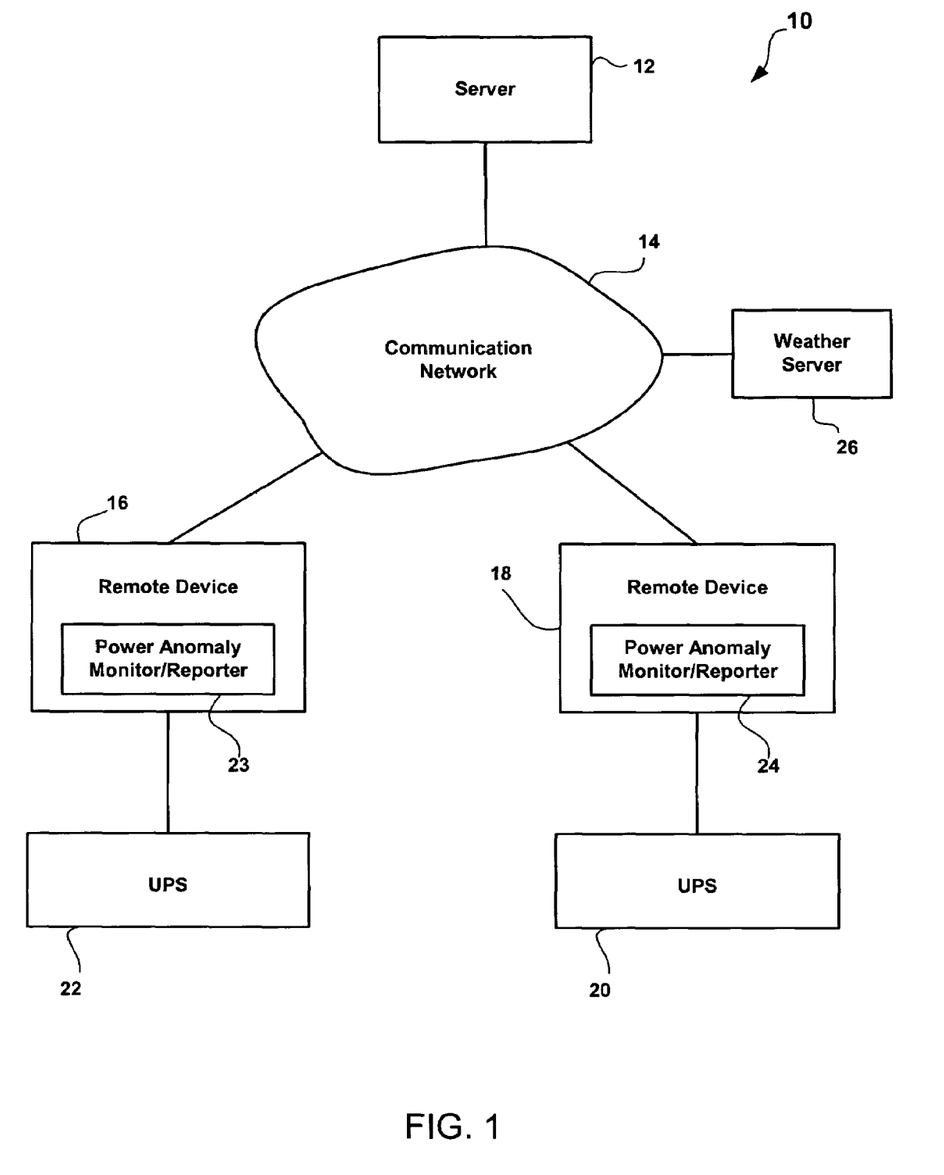
FIG. 1 is a simplified block diagram of a system for collecting and reporting power status information for multiple geographic areas.

Referring to FIG. 1, a system 10 includes a server 12, a communications network 14, remote devices 16, 18, uninterruptible power supply (UPSs) 20, 22, and a weather server 26. The server 12 and the remote devices 16, 18 are configured with communication interfaces and coupled for bidirectional communication with the network 14. The server 12 can be, e.g., a single computer server or a bank of servers, and information flowing into and out of the bank of servers may be load balanced. The communication network 14 can be any of a variety of communication networks currently known (e.g., the Internet, a local area network (LAN), a wide area network (WAN), an integrated services digital network (ISDN), a wireless network, etc.) or developed in the future. Although only one server 12 and two remote devices 16, 18 are shown, other numbers of servers and/or remote devices may be used. The remote devices 16, 18 can be any of several types of devices, e.g., personal computers or other computing devices, etc. The remote devices 16, 18 may be disposed remotely from each other such as in different zip codes, cities, counties, states, or even countries. The UPSs 22, 20 are connected to the devices 16, 18, and are configured to provide backup power to the devices 16, 18. Each of the UPSs 20, 22 and the devices 16, 18, include communication interfaces and are coupled as shown for bi-directional communication. In at least some embodiments, the UPSs 22, 20 may be coupled directly to the communications network 14.

The remote devices 16, 18 include power status monitor/reporters (MR) 23, 24, respectively. As the devices 16, 18 and the UPSs 20, 22 are similarly configured, primarily only the device 18 and the UPS 20 are discussed below. The device 18 includes a processor for performing instructions in software in the MR 24. The software in the MR 24 is also configured for general interaction with the UPS 20. The MR 24 is configured to detect power status at the device 18 or at the UPS 20 and to report power anomalies such as failures/outages, overvoltages, undervoltages or other problems with this power status via the communication network 14 to the server 12, and to receive information regarding power status from the server 12 via the network 14. The MR 24 is configured as a software program that is performed by a processor in the device 18. Other configurations, however, are possible such as pure hardware configurations, or combinations of hardware and software.

The MR 24 is configured to monitor power status at the UPS 20 and to report power status to both the server 12 and the UPS 20. The MR 24 can detect when the UPS 20 switches and/or has switched to battery operation indicating an anomaly in power, such as an outage or a reduction or increase in power exceeding a threshold. In response to detecting the switch to battery, the MR 24 can produce and send an indication of the power anomaly (i.e., power failing to meet requirements) that gets transmitted through the network 14 to the server 12. This power anomaly indication can provide the server 12 with a variety of information regarding the anomaly. For example, the information can include a location of the MR 24 that may be anywhere in a range of very fine to very coarse in resolution. For example, the location may be a physical location, global positioning satellite (GPS) coordinates, an address of the remote device 18 (e.g., an IP address or a street address), a zip code, a city, a county, a state, or a country of the remote device 18 and/or the UPS 20. The location could also be a power grid used by the device 18 such as a service area of a particular power provider/company/utility. The location is preferably a location that can be provided by the user of the device 18 (e.g., zip code, county), or by the device 18 itself (e.g., IP address). Further, the information can include a time of the anomaly. The MR 24 can also determine that the UPS 20 switches and/or has switched off of battery backup and report this power restoration event to the server 12, including similar information as when reporting a power anomaly. If power goes out and the battery runs out, the MR 24 will report when the power is restored. In this case, the server will shut down, power will return, the UPS will turn on, the server will reboot, the software will start up and report the power anomaly.

Information provided from the MR 24 is preferably provided using a low-level protocol and is done in a manner to reduce the likelihood of simultaneous high-reporting traffic. The low-level protocol preferably has very little effect on the traffic over the communication network 14. For example, the information can be provided using an HTTP POST command, although numerous other possibilities would be acceptable. To help avoid network overload due to numerous anomaly reports (e.g., from numerous MRs affected by the same power anomaly) the information can be reported asynchronously from MRs. The timing of reporting could be determined, e.g., using a random-number generator to determine with what time lag to send the information. Alternatively, the timing for reporting by individual MRs could be set by the server 12, with MRs likely to be affected by the same power anomaly being configured to stagger their reports. Other techniques could be used to help prevent reporting congestion including aggregating multiple power events into a single report and reporting them in one transaction.

The MR 24 can also be configured to provide heartbeat signals to the server 12. These heartbeat signals provide periodic (or possibly aperiodic) indicia that the MR 24 is operational and that the equipment between the MR 24 and the server 12 is operational and connected. The server 12 is configured to expect the heartbeat signals from the MR 24 and to respond appropriately if one or more of the heartbeat signals are not received, e.g., within an expected time frame. For example, if no heartbeats are received in a threshold amount of time, then the server 12 may determine that a failure has occurred in the MR 24, the remote device 16, the network 14, and/or one or more connections of these devices/systems to the server 12. The server 12 may respond by indicating a failure. If multiple heartbeats from multiple MRs 24 are not received within the same time frame, the server 12 may surmise that the network 14 has failed or that another, relatively global (as opposed to isolated to a particular MR) failure has occurred, such as a large-scale power outage.

The MR 24 may be selectively configured not to provide power status information to the server 12. For example, during installation of software for the device 18, the MR 24 may provide a prompt to a user of the device 18 asking whether the user wants or is willing to have information reported to the server 12. Preferably, the prompt will indicate what information will be reported, when, and to whom. The MR 24 will allow the user to opt out of having the MR 24 provide some or all of the power status information to the server 12. The MR 24 may be configured such that the MR 24 can still receive and display power-status information (as described below) even if the MR 24 does not supply its own power-status information to the server 12.

The server 12 is configured to receive and process (e.g., in a server processor) incoming power anomaly indicia from the MRs 23, 24 and to provide server output signals that include power status information such as accumulated/aggregated and collated power anomaly information. The server 12 can collect data from multiple individuals/companies/devices/organizations/locations and can thus provide information not typically available within a company or to an individual user. By processing received indicia of beginnings and ends of power anomalies, with associated information as to locations of the reporting MRs and/or the corresponding UPSs, the server 12 can determine start times and end times of power anomalies and associated locations of the power anomalies. The server 12 can determine timing of anomalies whether the reported information includes timing information or not, although any asynchronous nature of the reporting can be accounted for by the server 12 depending upon the resolution desired for determining the timing of anomalies (e.g., if the MRs all report within 2 seconds, and anomalies are only reported by the server 12 to the minute, then the server 12 preferably does not account for any asynchronous reporting by the MRs).

The server 12 also correlates power anomaly reports by the locations of the reports. Using this information, the server 12 can determine whether an anomaly is customer specific (e.g., if only a particular MR reports an anomaly corresponding to a given geographic region such as a zip code) or more widespread. The server 12 can provide information to an MR indicating that a reported anomaly is, or at least likely is, specific to that MR. Additionally, numbers and/or percentages of anomaly reports in any region discernable by the server 12 can be compared to respective thresholds (that may depend on the size of the region, number of registered MRs for the region, etc.) to determine whether any particular region should be deemed to be failing. The numbers and/or percentages may also be provided by the server 12 for display.

The server 12 could also collect information regarding the weather in regions serviced by the server 12. For example, by accessing the weather server 26 via the network 14, the server 12 can gather local, regional, or worldwide weather information. The server 12 can associate the weather data with the power status data to provide coordinated power status and weather data that may be desired by users assessing power quality. The weather data and power status data can be associated in the server output signals provided by the server 12.

The server 12 can accumulate the anomaly information received to determine power anomalies on a geographic basis and provide reports as to power anomalies to the remote devices 16, 18. The reports can indicate locations of present power anomalies and/or power anomalies over time. The reports can indicate how widespread an anomaly is, such as by indicating the number and/or percentage of MRs in respective regions reporting an anomaly. Resolution of the locations of anomalies can be anywhere from fine, such as zip code or city block, to large scale such as by state or even by country or continent. The server 12 can provide the information such that users of the remote devices 16, 18 can select the resolution to be displayed. The server 12 may also report power status information, such as power anomalies, to MRs whose remote devices and/or UPSs could be affected by a power anomaly.

Figure 2:
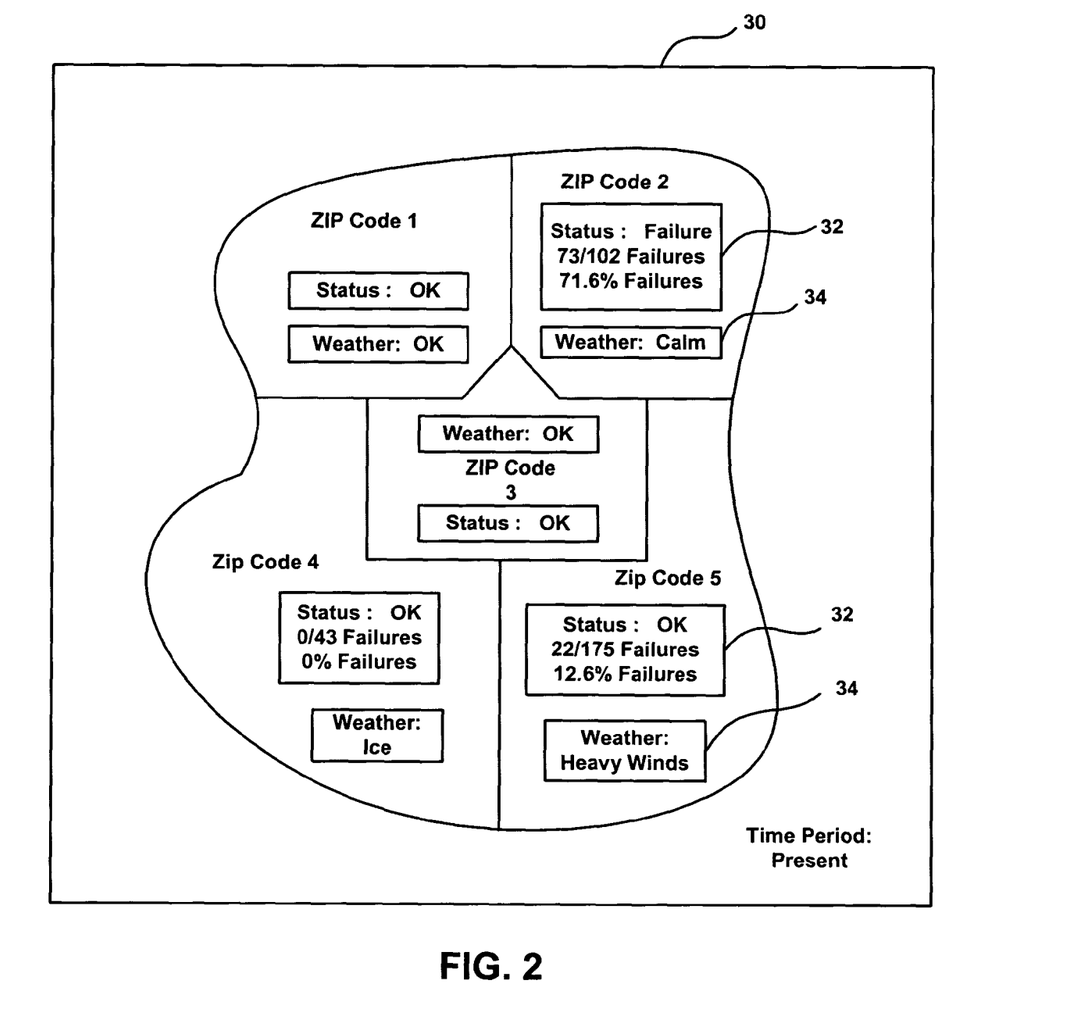
FIGS. 2-3 are exemplary screen displays of power status information associated with geographic regions.
Figure 3:
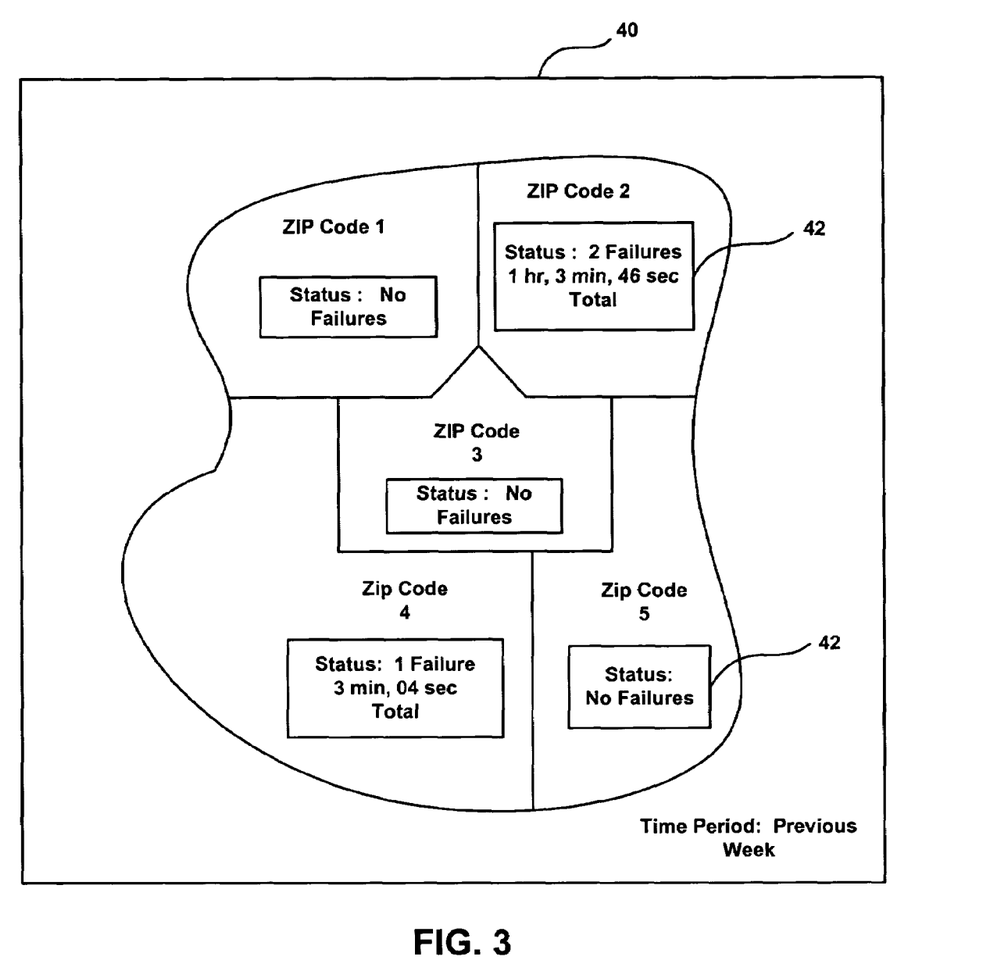

The MRs 23, 24 are further configured to receive and process the server output signals to provide desired information to users of the remote devices 16, 18. For example, referring to FIG. 2, the MRs 23, 24 can be configured to provide a screen saver display 30 for the remote devices 16, 18 that shows power status of geographic areas (e.g., local or national) and time frames (e.g., present, today, previous week, previous month) selected by the users. This could also be done by the power management software in the device 16, and/or other software running elsewhere. As shown in FIG. 2, the present power status for each zip code in a city is provided. Referring to FIG. 3, a display 40 shows the power status for the previous week is provided for the same city as shown in FIG. 2. Additionally, displays of the power status may be activated by the user without waiting for the screen-saver function.

The power status information can show where power is and/or has been acceptable and where power is failing and/or has failed. As shown in FIG. 2, status windows 32 indicate whether the power status in each region is presently OK or failing. One or more of the status windows 32 may indicate how many and/or what percentages of (and/or other indicia of amounts of and/or which) devices reporting power information in a particular region are failing. For example, in zip code 5, 22 of 175 devices (12.6%) in that region are failing, but the status is considered "OK." This is exemplary and not limiting; this rate of failures may be considered failing, e.g., depending upon the application, or upon user-selected criteria (e.g., an OK/failure threshold). Referring to FIG. 3, status windows 42 indicate how many anomalies there have been over the selected time period, and the total duration of those anomalies. Other indicia of present or historical power status are possible, such as shading or cross-hatching of the regions, different colors to indicate acceptable versus failing conditions, and/or blinking displays to indicate anomalies, or combinations of these. Still other techniques of indicating acceptable and unacceptable power status are possible. The user may consider this information and act on it as appropriate, e.g., stopping using a remote device if power anomalies are progressing toward the user or otherwise suggest that a future power anomaly is likely imminent.

Weather information may be provided in conjunction with the power status information for the various regions. As shown in FIG. 2, weather indicator windows 34 provide information about the weather in the respective regions. Forms of indicia other than text windows are possible, e.g., shading, cross-latching, coloring, or combinations of these. For example, indicia may be provided that the weather is OK, calm, windy, icy, etc. The user may take this information into account, e.g., to stop using the device 18 (e.g., if there are heavy winds in the user's region), or to stay on in case the power is restored shortly (e.g., if the weather is calm).

The system 10 can be used for a variety of applications. An exemplary use of the system 10 is to provide a point-of-sale display, e.g., for UPSs. Such a display could show the usefulness/necessity of such devices by showing would-be consumers how frequently power fails (or other anomalies occur) in an area in which the user would be likely to use a remote device for which adequate power is necessary. Another exemplary use of the system 10 is to help users troubleshoot problems to locate sources of the problems, or to have the system 10 troubleshoot problems. The MRs 23, 24 can process the server output signals and indicate to the user that a power anomaly is a device-specific anomaly, e.g., if few or no other reports of power anomalies have occurred in the user's area, or few or no other anomalies that began when that user's anomaly began. Thus, the user could analyze the user's local power supply to determine problems with the supply. These examples are not limiting, as other applications are within the scope of the invention.

Figure 4:
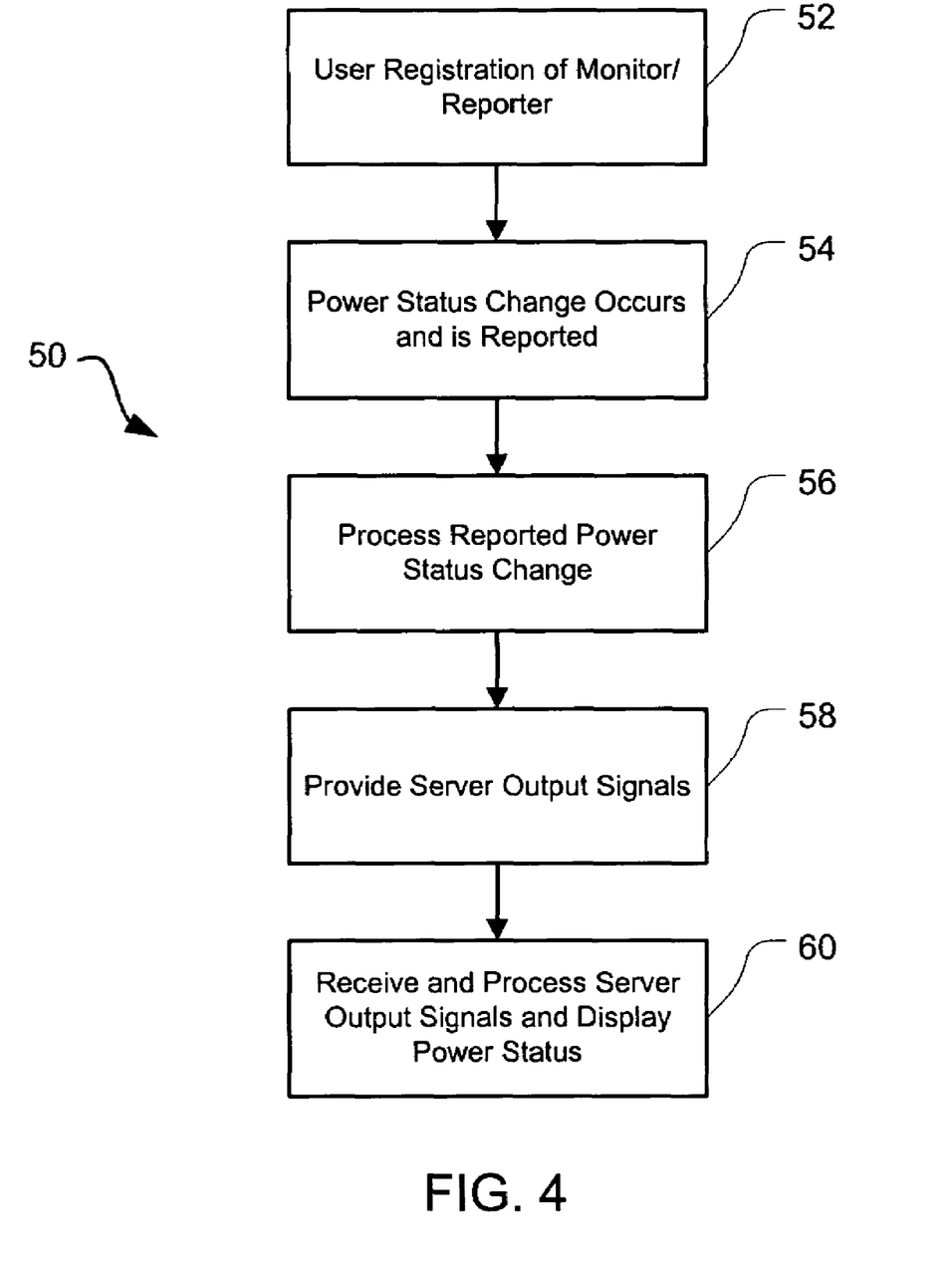
FIG. 4 is a block flow diagram of a process of collecting and reporting power status information for multiple geographic area.

In operation, referring to FIG. 4, with further reference to FIGS. 1-3, a process 50 for detecting, aggregating, and reporting power status using the system 10 includes the stages shown. The process 50, however, is exemplary only and not limiting. The process 50 can be altered, e.g., by having stages added, removed, or rearranged.

At stage 52, a user registers the MR 24 for reporting power-status information to the server 12. For example, the user may register the MR 24 as part of registering the UPS 20 for warranty purposes or during installation of software in the MR 24 for interaction with the UPS 20. The user chooses to be part of a network of MRs reporting power status information. The user may enter information as to the location of the MR 24 and/or the UPS 20, such as the zip code, GPS location, address, floor, city, county, state, and or country in which the MR 24 and/or UPS 20 will be used.

At stage 54, a power problem/anomaly or a return of power occurs at the device 18 and the MR 24 reports the anomaly. In response to a power anomaly, the UPS 20 switches to battery backup and the MR 24 detects the switchover. In response to a return of main power, the UPS 20 switches from battery backup to accepting power from the main power supply. The MR 24 reports the switchover from or to battery backup, along with information regarding the time of the anomaly and the location of the device 18 and/or the UPS 20. The report is sent to and through the network 14, to the server 12.

At stage 56, the server 12 processes the reported change from acceptable power to unacceptable power, or vice versa, from the MR 24, and any other power status reports from other MRs. The server 12 aggregates the information regarding power status over applicable regions. The server 12 analyzes the reports to determine numbers/percentages of anomalies in a given region and to determine whether a given region should be considered as failing (e.g., if the number and/or percentage of anomaly reports exceeds a respective threshold). The server 12 also analyzes reported power status data to determine if a power anomaly is a device-specific anomaly. The server 12 also stores data for historical purposes.

At stage 58, the server 12 provides server output signals to the MRs 23, 24 regarding the data processed by the server 12. These signals may indicate, e.g., that an anomaly is device-specific, and/or may provide information regarding power status for any of various regions in any of various resolutions and for a variety of time periods. The server 12 preferably provides the server output signals in response to receiving a report from the MR 24 and/or periodically. The output signals are sent to the MRs 23, 24 via the communication network 14.

At stage 60, the server output signals are received and processed by the MR 24 and the results displayed on the device 18. The results may be displayed by a screen saver, or may be displayed in response to a command initiated by the user. The user can select a desired resolution of locations for display of power status, as well as a desired time frame.

Other embodiments are within the scope and spirit of the appended claims. For example, due to the nature of software, functions described above can be implemented using software, hardware (e.g., an embedded web card), firmware, hardwiring, or combinations of any of these. Features implementing functions may also be physically located at various positions, including being distributed such that portions of functions are implemented at different physical locations. Additionally, the MRs 23, 24 can provide power status information periodically on a regular basis, even if no anomaly has occurred, and/or in response to a query from the server 12.

Other embodiments of the remote devices 16, 18 are possible. For example, the remote devices 16, 18 may be located in or attached to (e.g., inserted into a receptacle of) the UPSs 20, 22. Such devices would be configured to communicate with the network 14 and to provide a user interface such as a web page, and other management information. The devices could be network interface cards that are inserted into any of the UPSs 20, 22 and are configured to report information to the server 12. The devices could also be software stored and run by general-purpose computers attached to the UPSs 20, 22. Or, a combination of general-purpose computers, network interface cards, and/or the remote devices 16, 18 as described above can be used.

What is claimed is:

1. A computer program product for use with a computer that includes a communication interface for sending and receiving information over a communication network and that is connected to an uninterruptible power supply (UPS) that monitors and supplies information regarding power status associated with the UPS, the computer program product residing on a computer-readable medium and comprising computer-executable instructions for causing the computer to:

process data received from the UPS to which the computer is coupled to produce indicia of changes in power status associated with the UPS;

provide the indicia of changes in power status associated with the UPS to the communication interface destined for a remote device;

provide geographic information associated with the indicia of changes in power status that indicates a geographic location associated with the UPS; and process information received via the communication interface to display at least one of (1) a quantity of UPSs experiencing power failures in the geographic location, (2) a relative quantity of UPSs experiencing power failures in the geographic location, and (3) a percentage of UPSs experiencing power failures in the geographic location.

2. The computer program product of claim 1 further comprising instructions for causing the computer to process data entered by a user of the computer to produce the geographic information.

3. The computer program product of claim 1 further comprising instructions for causing the computer to process external power-status information received via the communication interface and to display indicia of power status and at least one geographic region associated with the indicia of power status in accordance with the processed external power-status information.

4. The computer program product of claim 3 further comprising instructions for causing the computer to display indicia of weather condition associated with each of the at least one geographic region.

5. The computer program product of claim 3 further comprising instructions for causing the computer to store data regarding changes in power status for historical display associated with at least one period of time.

6. An apparatus for communicating via a communication network with multiple remote devices connected to uninterruptible power supplies (UPSs) that monitor and supply information regarding power status associated with the UPSs, the apparatus comprising:

a communication interface configured to transfer data with the communication network; and a processor coupled to the communication interface and configured to:

collect power-status data and associated geographic data received from the remote devices via the communication interface, the power-status data indicating power status of the UPSs associated with the remote devices providing the power-status data, the geographic data indicating geographic locations associated with the UPSs;

analyze the power-status data and associated geographic data to determine power status of geographic regions indicated by the geographic data in accordance with the corresponding power-status data;

send indicia of the determined power status of at least one geographic region toward at least one of the remote devices via the communication network; and determine and send toward at least one of the remote devices indicia of at least one of (1) a quantity of UPSs experiencing power failures in the at least one geographic location, (2) a relative quantity of UPSs experiencing power failures in the at least one geographic location, and (3) a Percentage of UPSs experiencing power failures in the at least one geographic location.

7. The apparatus of claim 6 wherein the processor is configured to collect weather data for each region and to provide indicia of the weather for the at least one geographic region to the at least one of the remote devices.

8. The apparatus of claim 6 wherein the processor is further configured to store the determined power status and to provide historical power status for the at least one geographical region.

9. The apparatus of claim 6 wherein the processor is configured to send the determined power status data at least one of periodically and in response to a received indication of a power status change from at least one of the remote devices.

10. The apparatus of claim 6 wherein the processor is further configured to monitor heartbeat signals from the remote devices and provide indicia of failures if the processor fails to detect at least one heartbeat signal in a threshold amount of time.

11. A method of indicating power status in multiple geographic regions, the method comprising:
receiving, at a plurality of devices, indicia of power status from multiple uninterruptible power supplies (UPSs) coupled to the devices, the indicia of power status including geographic information indicating multiple geographic regions associated with the respective UPSs;
determining power-status data from the received indicia;
receiving power-status data from the plurality of devices coupled to the UPSs via a communication network;
analyzing the power-status data according to the multiple geographic regions associated with the power-status data;
sending indicia of power status associated with the multiple geographic regions toward at least one of the plurality of devices via the communication network, the indicia of power status including indicia of at least one of (1) quantities of UPSs experiencing power failures in the geographic regions, (2) relative quantities of UPSs experiencing power failures in the geographic regions, and (3) percentages of UPSs experiencing power failures in the geographic regions.

12. The method of claim 11 further comprising determining weather for the multiple geographic regions and sending indicia of the weather in the respective regions toward at least one of the plurality of devices via the communication network.

13. The method of claim 11 wherein the sending occurs at least one of periodically, in response to receiving an indication of a power-status change from at least one of the plurality of devices, and on demand by a user-initiated action.

14. The method of claim 11 further comprising displaying the indicia of power status at the at least one of the plurality of devices to indicate power status of the multiple geographic regions.

15. The method of claim 14 wherein the displaying comprises displaying a map of the multiple geographic regions and associated indicia of power status.

16. The method of claim 11 further comprising displaying the indicia of power status at the at least one of the plurality of devices to indicate power status of at least one of the multiple geographic regions in any of a variety of resolutions of geography.

17. The method of claim 16 wherein the displaying comprises displaying at least one of a number and a percentage of UPSs of the at least one of the multiple geographic regions whose powers are anomalous.

18. The method of claim 11 further comprising displaying the indicia of power status at the at least one of the plurality of devices to show power status over any of a selected variety of historical time periods.

19. The method of claim 11 further comprising sending an indication to a selected one of the plurality of devices indicating a local power anomaly in response to determining that relatively few power anomalies are associated with a geographic region associated with the selected device.

20. In combination:
an uninterruptible power supply (UPS); and
a device for use with a communication interface for sending and receiving information over a communication network, the device being configured to:
determine, from information received from the UPS, indicia of power status at the UPS;
provide indicia of changes in power status at the UPS to the communication interface destined for a remote server;
provide geographic information associated with the indicia of changes in power status that indicates a geographic location of the UPS; and
process information received via the communication interface to display at least one of (1) a quantity of UPSs experiencing power failures in the geographic location, (2) a relative quantity of UPSs experiencing power failures in the geographic location, and (3) a percentage of UPSs experiencing power failures in the geographic location.

21. The combination of claim 20 wherein the device comprises a computer program product residing on a computer-readable medium and comprising computer-readable readable and computer-executable instructions for causing a computer to provide the indicia and to provide the geographic information.

22. The combination of claim 20 wherein the device comprises a card configured to be physically and electrically coupled to the UPS and includes the communication interface.

23. The computer program product of claim 1 wherein the geographic information is a physical location, global positioning satellite coordinates, a street address, a ZIP CODE, a city, a county, a state, a country, or a power grid used by the UPS.

24. The apparatus of claim 6 wherein the geographic data is a physical location, global positioning satellite coordinates, a street address, a ZIP CODE, a city, a county, a state, a country, or a power grid used by the UPS.

25. The method of claim 11 wherein receiving, at the plurality of device, indicia of power status from the multiple UPSs includes receiving information indicative of a physical location, global positioning satellite coordinates, a street address, a ZIP CODE, a city, a county, a state, a country, or a power grid used by the UPS.

26. The combination of claim 20 wherein the geographic information includes information indicative of a physical location, global positioning satellite coordinates, a street address, a ZIP CODE, a city, a county, a state, a country, or a power grid used by the UPS.

27. An apparatus comprising:
an uninterruptible power supply (UPS); and
a device for use with a communication interface for sending and receiving information over a communication network, the device being configured to:
determine, from information received from the UPS, indicia of power status at the UPS;
provide indicia of changes in power status at the UPS to the communication interface destined for a remote server;
prompt a user to provide geographic information to the device that indicates a geographic location of the UPS;
associate the geographic information with the indicia of changes in power status at the UPS;
provide the geographic information, that indicates the geographic location of the UPS, associated with the indicia of changes in power status; and
process information received via the communication interface to display at least one of (1) a quantity of UPSs experiencing power failures in the geographic location, (2) a relative quantity of UPSs experiencing power failures in the geographic location, and (3) a percentage of UPSs experiencing power failures in the geographic location.

28. The apparatus of claim 27 wherein the geographic information is a physical location, global positioning satellite coordinates, a street address, a ZIP CODE, a city, a county, a state, a country, or a power grid used by the UPS.

* * * * *